United States Patent [19]

Papalexis et al.

[11] 3,988,096
[45] Oct. 26, 1976

[54] DOUGH SCALER
[76] Inventors: Gregory C. Papalexis, Cambridge Way, Alpine, N.J. 07620; Richard I. Elliott, 103 Penfield Ave., Croton-on-Hudson, N.Y. 10520
[22] Filed: Sept. 9, 1974
[21] Appl. No.: 504,459

[52] U.S. Cl. ............................ 425/145; 425/166; 425/311; 222/340; 222/564
[51] Int. Cl.² ........................................ A21C 5/00
[58] Field of Search .......... 425/147, 239, 240, 241, 425/309, 310, 311, 145, 162, 164, 142, 166; 222/64, 340, 564

[56] References Cited
UNITED STATES PATENTS

| | | | |
|---|---|---|---|
| 2,221,328 | 11/1940 | Rhodes | 425/239 |
| 2,890,662 | 6/1959 | Baiocchi | 425/311 |
| 3,212,136 | 10/1965 | Levett | 425/162 |
| 3,398,702 | 8/1968 | Behr | 425/147 X |
| 3,459,141 | 8/1969 | Keil | 425/311 |
| 3,605,643 | 9/1971 | Barr | 425/241 |
| 3,715,062 | 2/1973 | Todd et al. | 222/340 |
| 3,864,067 | 2/1975 | Kajitani | 425/166 |

Primary Examiner—Francis S. Husar
Assistant Examiner—David S. Safran

[57] ABSTRACT

An improved dough scaler for preshaping and cutting a predetermined amount of dough comprising: a dough pressure chamber; a movable pressure plate slidably engaging the upper end of pressure chamber for compressing the dough; equalizing compression springs connected between the pressure plate and the pressure chamber to maintain constant dough pressure throughout the chamber; switching means to control the proper amount of dough pressure for the dough to be extruded through sizing ports on an extrusion plate mounted at the lower end of the pressure chamber; and valve-like cutting means connected to the extrusion plate to cut the extruded dough to the proper size. Consistent dough quality, size, and shape are produced at a rapid rate with a fewer number of intermediate operational steps.

7 Claims, 7 Drawing Figures

U.S. Patent  Oct. 26, 1976  Sheet 1 of 2  3,988,096
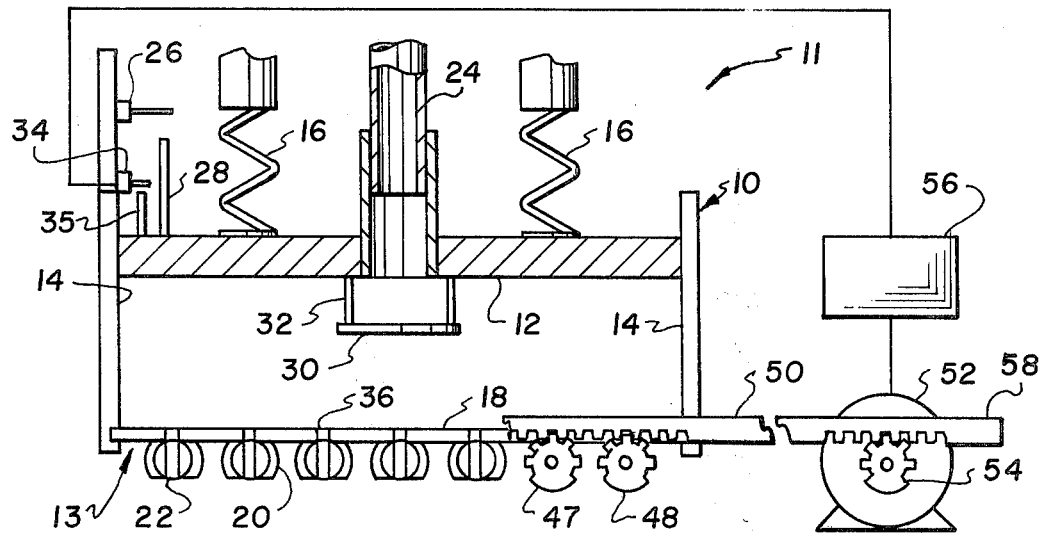
FIG. 1
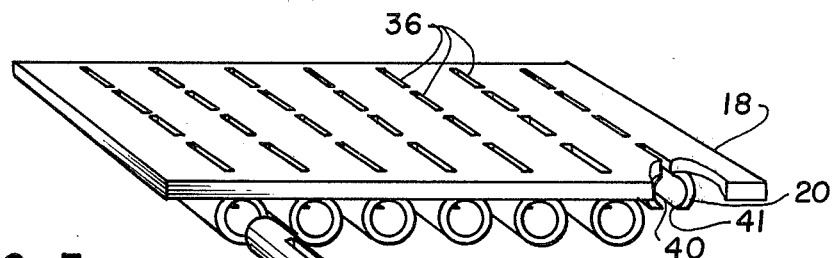
FIG. 3  FIG. 2
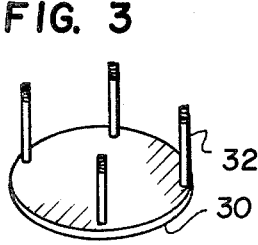
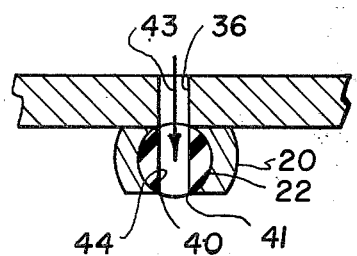
FIG. 4
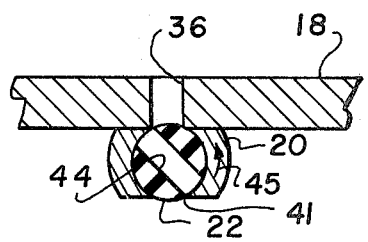
FIG. 5

DOUGH SCALER

BACKGROUND OF THE INVENTION

1. Field of the Invention

The present invention lies in the general category of dough processing machines. In particular, the invention is concerned with a dough scaling machine which shapes and cuts a predetermined amount of dough prior for baking. More particularly, this dough scaler operates in three steps comprising: dough compression by means of a pressure chamber; sizing by means of an extrusion plate; and cutoff by valve-like cutting means.

2. Description of Prior Art

Heretofore, conventional dough scaling machines required several intermediate steps during the scaling process which resulted in a slower production rate and, consequently, inefficient operation.

Some of these intermediates steps required dough delivery by means of pistons operated by compressed air with vacuum assistance in the dough chamber, a conveyor belt for moving the dough to a rounding board where flour would be sifted on the dough, then it would fall onto an intermediate proofer, then onto a double roller for flattening, then onto another conveyor belt for delivery to a panning device.

All of these previous steps are now replaced by the present invention having a simplified three step operation which comprises: dough compression; scaling; and cutting. One feature of the invention provides means for building up dough pressure to a constant level throughout a pressure chamber prior to extrusion to obtain consistent quality of the extruded dough pieces. Another feature of this invention provides for a rapid scaling rate by means of a combined scaling and cutting operation.

SUMMARY OF THE INVENTION

The purpose of the present invention is to provide a dough scaler for shaping and cutting a predetermined amount of dough comprising: a dough pressure chamber; a movable top pressure plate connected to pressure equalizing springs, in order to provide a consistent dough pressure in all parts of the pressure chamber; a bottom extrusion plate having sizing ports; and valve-like cutting means attached to the extrusion plate.

Degassed dough is scaled in three steps: first, the dough is compressed to a constant distribution pressure by the pressure plate; and in closely joined second and third steps the dough is scaled and cut by means of a valve-like cutting means.

A major object of the invention is to eliminate the intermediate steps of a conventional dough scaler, to obtain a faster production rate and increase efficiency by means of a constant pressure applied to a multiport extrusion plate and quick acting cutting devices.

Another object is to produce scaled dough of consistent quality, shape, and size.

Still another object is to eliminate dusting flour during the scaling operation.

An additional object of this invention is to replace more complex scaling machines with a simpler, more economical machine requiring less maintenance.

Other objects and many additional advantages will be more readily understood by those skilled in the art after a detailed consideration of the following specification taken with the accompanying drawing.

DESCRIPTION OF THE DRAWINGS

FIG. 1 is a front elevational view partially in section of the present invention depicting a dough pressure chamber housing, a pressure plate engaging the upper section of the pressure chamber, pressure equalizing springs connected to the pressure plate, and a lower extrusion plate with cutting tubes and scaling shafts.

FIG. 2 is a perspective view of an extrusion plate showing sizing ports on the top surface and attachment of the cutting tubes and scaling shafts to the bottom surface of the extension plate.

FIG. 3 is a perspective view showing a baffle plate with supporting rods.

FIG. 4 is a vertical cross sectional view showing a sizing port on the extrusion plate and the attached cutting tube and scaling shaft. The scaling shaft which functions as a dough valve is shown in an open position.

FIG. 5 is a vertical cross sectional view similar to FIG. 4 except that the scaling shaft is shown rotated to indicate a closed dough valve position.

DESCRIPTION OF THE INVENTION

Figure 6:
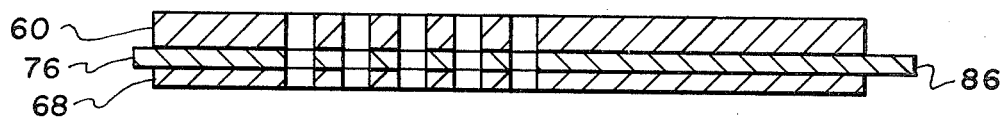
FIG. 6 is a vertical cross sectional view showing a cutting plate sandwiched between two extrusion plates.

In the past, conventional dough scalers required many intermediate steps which resulted in complex machinery, a slow production rate, higher cost, and reduced efficiency. The present invention provides a simplified machine for dough scaling by utilizing three operational steps consisting of dough compression, sizing, and cutting.

Referring to the drawing, a front elevational view of the dough scaler can be seen in FIG. 1. The dough scaler comprises a dough pressure chamber housing 10, having an upper entrance end section 11 and a lower exit end section 13, a pressure plate 12 engaging the upper section of the pressure chamber 10 and vertically movably mounted between upper interior sides 14 of the pressure chamber 10. The dough scaler further comprises pressure equalizing springs 16 connected to the pressure plate 12 and a lower dough extrusion plate 18 with cutting tubes 20 and scaling shafts 22.

In the operation of the system degassed dough is delivered to the dough pressure chamber housing 10, for compression by means of the pressure plate 12. The pressure plate 12 is in movable contact with the upper interior sides 14 of the pressure chamber housing 10. Dough enters the pressure chamber 10 by means of a telescopic inlet port tube 24 so that movement of the pressure plate 12 will not cause dough leakage.

As dough pressure inside the pressure chamber 10 builds up, the pressure plate 12 moves upward. However, this movement is restricted by the pressure equalizing springs 16 so that pressure plate movement is proportional to dough pressure. Due to the high viscosity of dough this piston-like structure provides an even dough pressure throughout the pressure chamber 10. In addition, a dough deflection baffle 30 spreads incomming dough more evenly within the pressure chamber. This baffle can be seen more clearly in FIG. 3, which also shows supporting rods 32.

In order to determine when the proper dough pressure is reached, an electromechanical switch 34 is utilized. When an extension rod 35, mounted on the top surface of the pressure plate 12, touches the actuator of the switch 34 other parts of the dough scaler are activated. Similarly, an electromechanical switch 26 is used to indicate a dough overpressure condition.

Attached to the lower end of the pressure chamber 10 is the dough extrusion plate 18. This extrusion plate 18 can be more clearly seen in FIG. 2, which shows elongated dough sizing ports 36 which extends the dough therethrough. Although the elongated sizing ports 36 shown are for preshaping dough for frankfurter rolls, other shapes such as for hamburgers buns can also be utilized.

After the dough is extruded through the sizing ports 36 it enters the cutting tube 20 which is integrally connected to the bottom surface of the extrusion plate 18. The cutting tube 20 has a slot 40 cut longitudinally at intervals along its lower section directly below and in alignment with the sizing port 36. Bevelled knife edges 41 are formed at the slot 40 as best seen in FIG. 4.

Within the cutting tube 20 the cylindrical scaling shaft 22 is rotatably mounted. This scaling shaft 22 has corresponding sizing auxiliary ports 44 extending through its transverse axis as seen in FIG. 2.

When the scaling shaft 22 is in the open valve position shown in FIG. 4 dough is extruded through the main sizing port 36 and enters the auxiliary port 44 in the scaling rod 22. After a predetermined amount of dough has passed through the slot 40 on the cutting tube 20, as shown by arrow 43, the scaling shaft 22 is rotated as shown by arrow 45 in FIG. 5, and the scaled dough piece is severed by knife edge 41 of the cutting tube 20.

In order to turn all scaling rods at the same time through the same angle, each scaling rod has gear pinion 47, 48 connected to one of its ends. These gear pinions are then driven by the linear motion of a toothed rack 50, 58 as shown in FIG. 1.

When normal dough pressure is reached switch 34 activates the scaling shafts into an open valve position, a controller 56 then energizes a reversible device such as motor 52 which turns the rack 50 by means of motor pinion 54 which closes the valve after the proper amount of dough has been scaled. If the dough pressure, in the pressure chamber, increases to an abnormally high value then the pressure plate 12 will trip switch 26 which in turn will shut off dough delivery to the inlet port tube 24 until normal dough pressure is restored.

During normal operation the scaled dough drops into a receiving pan containing shaped molds. This pan may be mounted on a conveyor belt having a weighing monitor so that the conveyor belt will not advance until the pan has received all the scaled dough pieces.

Figure 7:
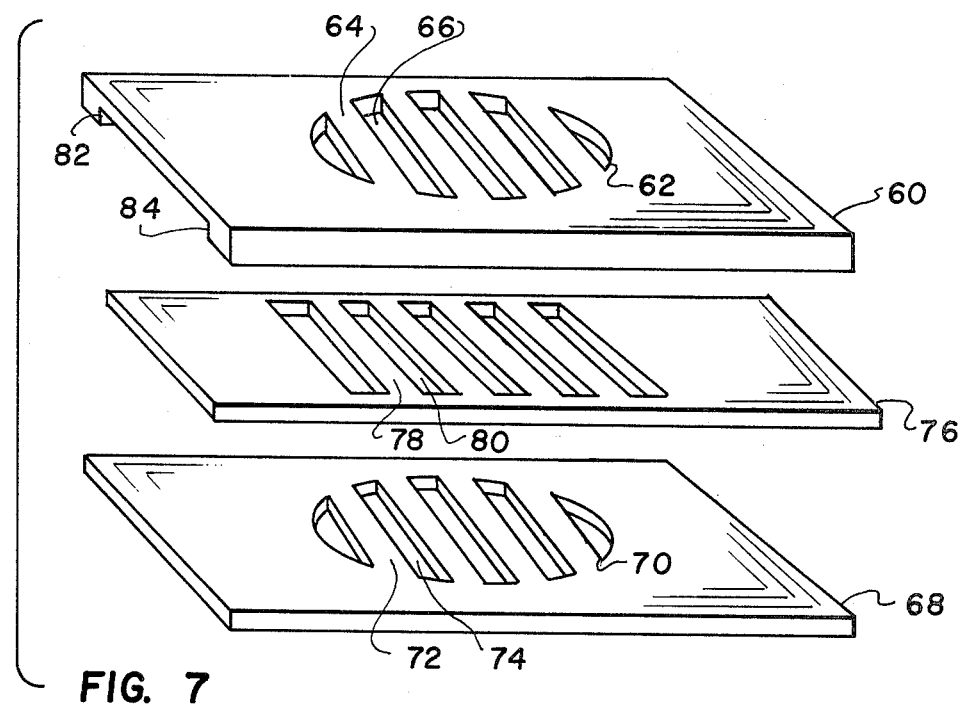
FIG. 7 is an exploded perspective view of the cutting plate and extrusion plates of FIG. 6 showing the slotted sections of the sizing ports.

An alternate arrangement of the dough sizing means utilizes a different structure which can be seen in FIGS. 6 and 7. An upper extrusion plate 60 having sizing ports 62 is mounted on the lower end of the pressure chamber. The sizing port 62 shown in FIG. 7 has a round outline for producing hamburger buns or similar baked products having a wide cross sectional area. The unique feature of this sizing port 62 is the alternate solid 64 and slotted sections 66 across the area of port. The purpose of this configuration will be explained later.

Similarly a second extrusion plate 68, also having an identically configured sizing port 70 to that of 62, is mounted at a fixed distance below the first extrusion plate 60. A cutting plate 76 is sandwiched between the two extrusion plates 60, 68 and in slidable contact with the two plates. The cutting plate also has alternate solid 78 and slotted 80 sections, however, these sections 78, 80 are all equal to the widest diameter of the sizing ports of the first and second extrusion plates.

In operation the cutting plate 76 moves so that its slotted sections 80 are always in parallel to the slotted sections 66, 74 of the first and second extrusion plates 60, 68. In this manner a relatively small travel of the cutting plate 76 equal to approximately the width of one slotted section will cut the scaled dough in a much shorter time as compared to an unslotted sizing port. The actual cutting of the dough is accomplished when the edge of the slotted sections of the cutting plate 76 touch the solid sections of the extrusion plates 60, 68.

After the bits of dough from the slotted sections of each sizing port have been severed they fall into a pan having molds of the desired shape. In a relatively short time the bits of moist viscous dough merge together to form an integral unbroken mass within each mold. The pan then moves to the next operation on a conveyor belt.

In order to obtain a high spred repetitive cutting action of the cutting plate 76 a reciprocating drive means is connected to the cutting plate 76 at one end 86.

This drive means may be a rack 58 and pinion 54 where the rack 58 is connected to the cutting plate at 86 and the pinion 54 is oscillated by a rotary power device 52. A control unit 56 provides the proper timing sequence for the rotary power device 52.

In summary, the novel structure of this dough scaler provides a high production rate of scaled dough having consistent quality, size, and shape.

While preferred embodiments of the invention have been illustrated and described, various changes in the form and relative arrangements of the parts, which will now appear obvious to those skilled in the art may be made without departing from the scope of the invention. Reference, is therefore, to be had to the appended claims for a definition of the limits of the invention.

What is claimed is:

1. A dough scaler for preshaping and cutting a predetermined amount of dough comprising:
 a dough pressure chamber housing having an upper entrance end section and lower exit end section;
 dough compressing means slidable engaging said upper end section of the dough pressure chamber housing;
 dough sizing means connected to said lower end section of the dough pressure chamber housing; and
 position sensing means connected to said upper end section of the dough pressure chamber housing in operable juxtaposition to the dough compressing means and wherein said dough compression means comprises a pressure plate mounted in a horizontal plane an slidable engaging interior sidewalls of the pressure chamber housing;
 at least one dough inlet port structure telescopically connected to the pressure plate to allow the pressure plate to move vertically while dough fills the pressure chamber;
 at least one dough pressure equalizing means connected between the top surface of the pressure plate and the pressure plate and the pressure chambers housing; and dough deflection means connected to bottom surface of the pressure plate.

2. A dough scaler in accordance with claim 1 wherein said dough sizing means comprises:
- a horizontal dough extrusion plate connected to the lower end section of the pressure chamber housing, said dough extrusion plate having at least one vertically extending first sizing port therethrough to preshape and extrude the dough;
- at least one cylindrical cutting tube connected to bottom surface of the extrusion plate said cutting tube having a corresponding second upper and third lower sizing ports extending through its vertical axis with the second and third sizing ports directly below and in alignment with said first sizing port;
- dough cutting means connected to lower section of cutting tube;
- at least one cylindrical scaling shaft rotatably mounted and closely fitted within the cutting tube, said scaling shaft having a fourth corresponding sizing port shaft through its transverse axis so that said scaling shaft functions as a valve allowing a predetermined amount of dough to exit from the dough scaler; and
- rotary drive means connected to one end of the scaling shaft to produce rotary action about its longitudinal axis and resulting valve action between the scaling shaft and the cutting tube.

3. A dough scaler in accordance with claim 2 wherein said position sensing means comprises:
- a first switch mounted on the pressure chamber housing for sensing position of the pressure plate when normal dough pressure is reached in order to actuate the scaling shaft; and,
- a second switch mounted on the pressure chamber housing for sensing position of the pressure plate for dough overpressure and halting dough delivery into the inlet port.

4. A dough scaler in accordance with claim 1 wherein said dough deflection means comprises: a baffle plate mounted at a space distance below the inlet port of the pressure plate to spread incoming dough more, evenly in the pressure chamber.

5. A dough scaler in accordance with claim 1 wherein said dough pressure equalizing means comprises: at least one compression spring mounted vertically between the top surface of the pressure plate and the pressure chamber housing so that dough pressure will be coverted to a vertical displacement of the pressure plate with respect to the pressure chamber housing.

6. A dough scaler in accordance with claim 2 wherein said rotary drive means comprises: a gear pinion mounted on one end of each scaling rod; and a linear toothed rack meshing with each gear pinion so that linear motion of the rack produces simultaneous rotary motion of said gear pinions.

7. A dough scaler in accordance with claim 2 wherein said cutting means comprises: a bevelled knife edge formed on periphery of said longitudinal slot of the cutting tube so that dough pieces predetermined size and shape are cut by said valve action between the scaling shaft and the cutting tube.

* * * * *